US005532731A

United States Patent [19]
Mihara et al.

[11] Patent Number: 5,532,731
[45] Date of Patent: Jul. 2, 1996

[54] METHOD AND APPARATUS FOR ADJUSTING IMAGE FORMING POSITIONS TO ALLOW PLURAL IMAGES TO BE FORMED ON PLURAL RECORDING SHEETS

[75] Inventors: Takashi Mihara; Masaki Tsuchiya; Junichiro Higuma; Seiji Kikuchi; Hiromi Okada, all of Osaka, Japan

[73] Assignee: Mita Industrial Co., Ltd., Osaka, Japan

[21] Appl. No.: 156,896

[22] Filed: Nov. 24, 1993

[30] Foreign Application Priority Data

Nov. 30, 1992 [JP] Japan ................................. 4-321017

[51] Int. Cl.⁶ ............................................. H04N 1/21
[52] U.S. Cl. ............................................. 347/250
[58] Field of Search ............................ 347/250, 261, 347/132, 247, 235, 237

[56] References Cited

U.S. PATENT DOCUMENTS 3,848,087  11/1974  Carrell .............................. 347/250
5,239,313  8/1993  Marko et al. ....................... 347/137

Primary Examiner—Mark J. Reinhart
Attorney, Agent, or Firm—Beveridge, DeGrandi Weilacher, Young

[57] ABSTRACT

The present invention is applied to an apparatus in which laser light corresponding to images to be formed scans a photoconductor at an approximately constant velocity in order to write a plurality of images arranged along a scanning direction of the laser light, in parallel. A scanning velocity of the laser light is varied to adjust a writing position of the image to be written last among the plurality of images by the laser light.

8 Claims, 7 Drawing Sheets

FIG. 7
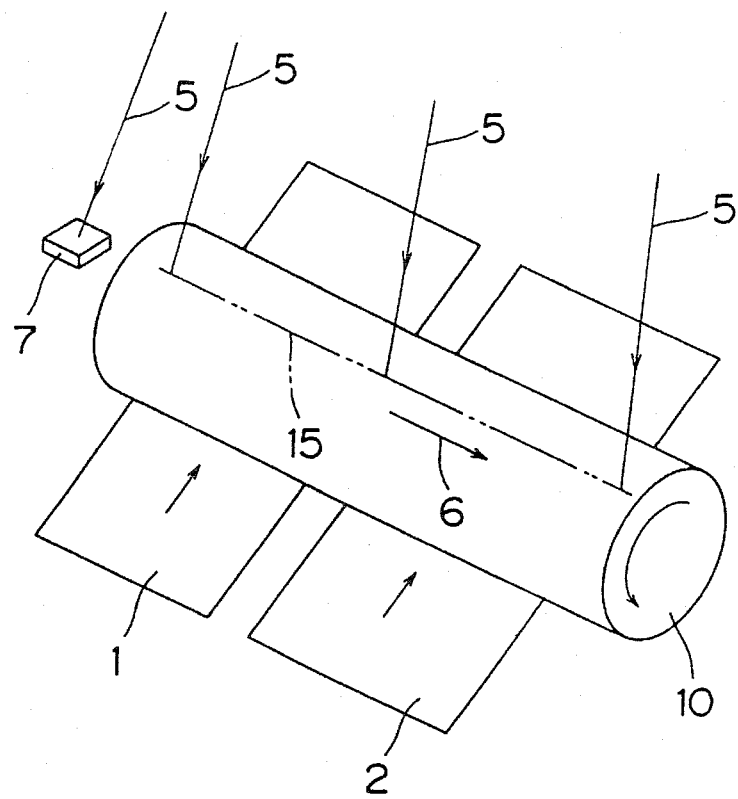
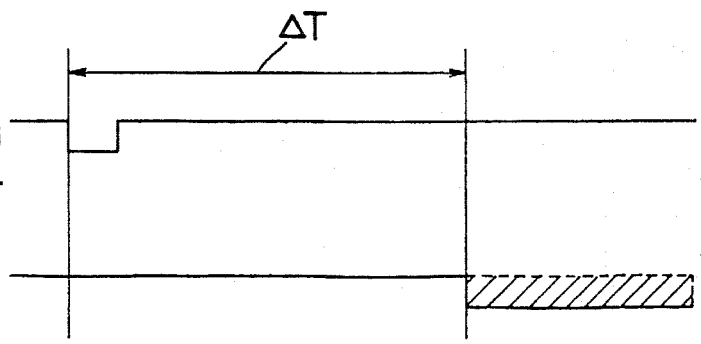
FIG. 8 (a) HORIZONTAL SYNCHRONIZING SIGNAL
FIG. 8 (b) VIDEO SIGNAL

METHOD AND APPARATUS FOR ADJUSTING IMAGE FORMING POSITIONS TO ALLOW PLURAL IMAGES TO BE FORMED ON PLURAL RECORDING SHEETS

BACKGROUND OF THE INVENTION

1. Field of the Invention

The present invention relates to a method of adjusting image forming positions, which can be applied to an image forming apparatus so arranged that images can be simultaneously formed on a plurality of sheets of recording paper fed in parallel. The present invention also relates to an image forming apparatus having an improved arrangement that enables an adjustment of image forming positions on a plurality of sheets of recording paper fed in parallel. Examples of the image forming apparatus are a copying machine and a laser printer.

2. Description of the Related Art

Laser beam printers for recording images on recording paper in accordance with an electrophotographic process have been widely used. In such laser beam printers, image formation is conducted in the following manner: a photoconductor electrostatically charged evenly throughout its surface is scanned by a laser beam to form an electrostatic latent image corresponding to an image to be formed. The electrostatic latent image is developed into a toner image, and thereafter, the toner image is transferred and fixed to the recording paper.

For example, in a laser beam printer of which the maximum print size is equivalent to a size of Line B, No. 4 of the Japan Industrial Standard (referred to as "B4-size" hereinafter), a photoconductor which can cover a short side of a B4-size sheet is provided. When a photoconductor shaped in a right circular cylinder is used, it would be designed so that a length of its extension along an axial direction is longer than the short side of the B4-size sheet. The "B4-size" referred to herein is one of typical patterns of paper sheet dimensions prescribed according to the Japan Industrial Standard, and measures 257 (mm)×364 (mm).

Such printers can perform printing in sheets considerably smaller than B4-size, such as post cards and envelopes. However, most parts of the photoconductor are not used in recording images in such small size sheets. Thus, for the most parts of the photoconductor, electrostatic charge and exposure to the laser beam are uselessly conducted. Thus, there arises a problem that fatigue of the photoconductor proceeds regardless of the size of the recording paper.

On recent years, an apparatus which can record images in two sheets of recording paper in parallel for small recording paper, such as envelopes, has been developed. In such an apparatus, two sheets of recording paper are fed to the photoconductor in parallel. Then, images for the two sheets are written onto a surface of a photoconductor by the laser beam.

More specifically, as depicted in a schematic view of FIG. 7, two envelopes 1 and 2 are fed in parallel simultaneously to a photoconductor 10 shaped in a right circular cylinder. Laser beam 5 emitted by a laser light source (not shown) scans the photoconductor 10 along its elongated extension. The photoconductor 10 is rotated about its axial line at a fixed speed.

The laser beam 5 is modulated suitable to images to be recorded on the envelopes 1 and 2. Thus, in a region corresponding to the envelope 1, the laser beam 5 modulated suitable to the image to be recorded on the envelope 1 reaches the surface of the photoconductor 10. Similarly, the laser beam 5, when applied in a region corresponding to the envelope 2, is modulated suitable to the image to be recorded on the envelope 2.

A beam detector 7 is provided in a specified position on an upstream side from the photoconductor 10 along a scanning direction 6 of the laser beam 5. The process for modulating the laser beam 5 corresponding to the image to be formed is started at a specified timing after the beam detector 7 detects the laser beam 5 and outputs a beam detecting signal expressing the detection. This ensures that an electrostatic latent image corresponding to the desired image is written at a predetermined position of the photoconductor 10.

Specifically, as shown in FIG. 8(a), based upon the beam detecting signal output by the beam detector 7, a horizontal synchronizing signal, which is utilized as a reference for timing of data output, is produced. After a specified period of time ΔT has elapsed from output of the horizontal synchronizing signal, a video signal is output to modulate the laser beam 5 suitable to the image data (depicted in a shadowed part in FIG. 8(b)).

Around the photoconductor 10, the following devices are arranged an electrostatic charger for electrostatically charging the photoconductor 10 uniformly throughout its surface before exposure to the laser beam 5, a developing device for developing an electrostatic latent image formed by exposure to the laser beam 5 into a toner image, a transferer for transferring the toner image to the envelopes 1 and 2, and a cleaning device for removing residual toner on the surface of the photoconductor 10 after the transfer. These components work together to record images on the envelopes 1 and 2.

In such an arrangement, image recording can be conducted on the envelopes 1 and 2 in parallel, and therefore, the photoconductor 10 can be effectively used. Thus, when image formation is performed onto small recording paper, the photoconductor 10 can be less fatigued relative to the number of sheets processed. Moreover, since image recording is conducted on two sheets of the recording paper in parallel, image recording can be performed at high speed.

Meanwhile, when it is desirable to form images accurately registrated with a pair of the envelopes 1 and 2, it is essential to make a mutual adjustment between a paper feed mechanism for feeding the envelopes 1 and 2, and an image forming unit including the photoconductor 10 and the like. Specifically, even among printers having the same constitution, it is inevitable that there will be variations of 1 mm to 2 mm in relationship between positions where the envelopes 1 and 2 are fed to and come in contact with the photoconductor 10 and positions on the photoconductor 10 where images are written by the laser beam 5. Hence, adjustment between the paper feed mechanism and the image forming unit is required in the manufacturing line for each printer.

A technique of such adjustment will be described with reference to FIGS. 9(a) and 9(b). As shown in FIG. 9(a), for example, it is assumed that, on the surface of the photoconductor 10, a writing start position WS1 is deviated by ΔW1 from the position where the envelope 1 is in contact with the photoconductor 10 to a downstream side of the scanning direction 6. The writing start position WS1 is on a scanning line 15, and image writing by the laser beam 5 is started from the position. Such deviation in position can be recognized if the image recording onto the envelopes 1 and 2 is performed on trial.

In such a case, a period of time ΔT from output of a horizontal synchronizing signal until output of a video signal (see FIGS. 8(a) and (b)) is shortened. In this way, as shown in FIG. 9(b), since the writing start position WS1 is deviated to an upstream side along the scanning direction 6, the writing start position WS1 and the position where the envelope 1 is in contact with the photoconductor 10 can be registered. Eventually, the image recording on the envelope 1 can be performed at good positional accuracy.

If it is desirable to deviate the writing start position WS1 to the downstream side along the scanning direction 6, there is a need to extend a period of time ΔT from the output of the horizontal synchronizing signal until the output of the video signal to modulate the laser beam 5.

With the adjustment as mentioned above in the manufacturing line before shipment of products, the image recording on the envelopes 1 and 2 is to be conducted well when the products are delivered to users.

However, with the adjustment technique as stated above, as the writing start position WS1 is deviated, a writing start position WS2 for the envelope 2 is also deviated by the equivalent distance along the scanning direction 6. Hence, when a distance D between the envelope 1 and the envelope 2 varies among manufactured printers, variations in the distance D cannot be absorbed by the adjustment as mentioned above.

For example, as shown in FIG. 9(b), there occurs a case where the adjustment as stated above causes the writing start position WS2 for the envelope 2 to be deviated by ΔW2 in spite of accurate positioning as to the writing start position WS1. The adjusting technique as stated above cannot vary the writing start positions WS1 and WS2 for the envelopes 1 and 2 separately, and eventually, the deviation ΔW2 is unavoidable.

In practice, it is empirically found that the distance D between the envelope 1 and the envelope 2 varies 1 mm to 2 mm among the yielded printers. More precise arrangement of the paper feed mechanism might suppress the variations in the distance D, but it is impractical because of excessive cost increase.

SUMMARY OF THE INVENTION

It is an object of the present invention to overcome the above technical disadvantage and to provide a method of adjusting image forming positions, in which image writing positions corresponding to a plurality of images arranged along a scanning direction of laser light can be adjusted well.

It is another object of the present invention to provide an image forming apparatus having an improved arrangement for well adjusting image writing positions corresponding to a plurality of images arranged along a scanning direction of laser light.

The present invention is applied to an apparatus in which laser light corresponding to images to be formed scans a photoconductor at an almost constant velocity to write a plurality of images arranged along a scanning direction of the laser light onto the photoconductor, in parallel. In the present invention, a scanning velocity of the laser light on the photoconductor is varied to adjust image forming positions so that a writing position of the image to be written last of all the images lies in a specified position.

Although the writing positions of the images are varied when the scanning velocity of the laser light is varied, such variations become larger as those positions are farther from a scanning start position from which the laser light starts scanning. Hence, even if the scanning velocity of the laser light is varied so that the writing position of the image to be written last by laser light scanning lies in a specified position, the image writing position close to the scanning start position is not varied so much. Thus, the writing positions of the images far from the scanning start position can be adjusted without exerting much effect upon the writing position of the image close to the scanning start position.

Since adjustment of the writing position of the image close to the scanning start position can be performed by adjusting the timing of the start of the writing, each of the writing positions of the images close to and far from the scanning start position can be adjusted separately. As a result, the images arranged along the scanning direction of the laser light can be formed well.

These and other objects, features, and effects of the present invention will become more fully apparent from the following detailed description of the preferred embodiment when taken in conjunction with the accompanying drawings.

BRIEF DESCRIPTION OF THE DRAWINGS

FIG. 7 is a schematic diagram illustrating a concept of parallel image formation onto two envelopes;

FIGS. 8(a) and 8(b) are timing charts illustrating a way of setting an image writing position on a photoconductor.

DESCRIPTION OF PREFERRED EMBODIMENT

Figure 1:
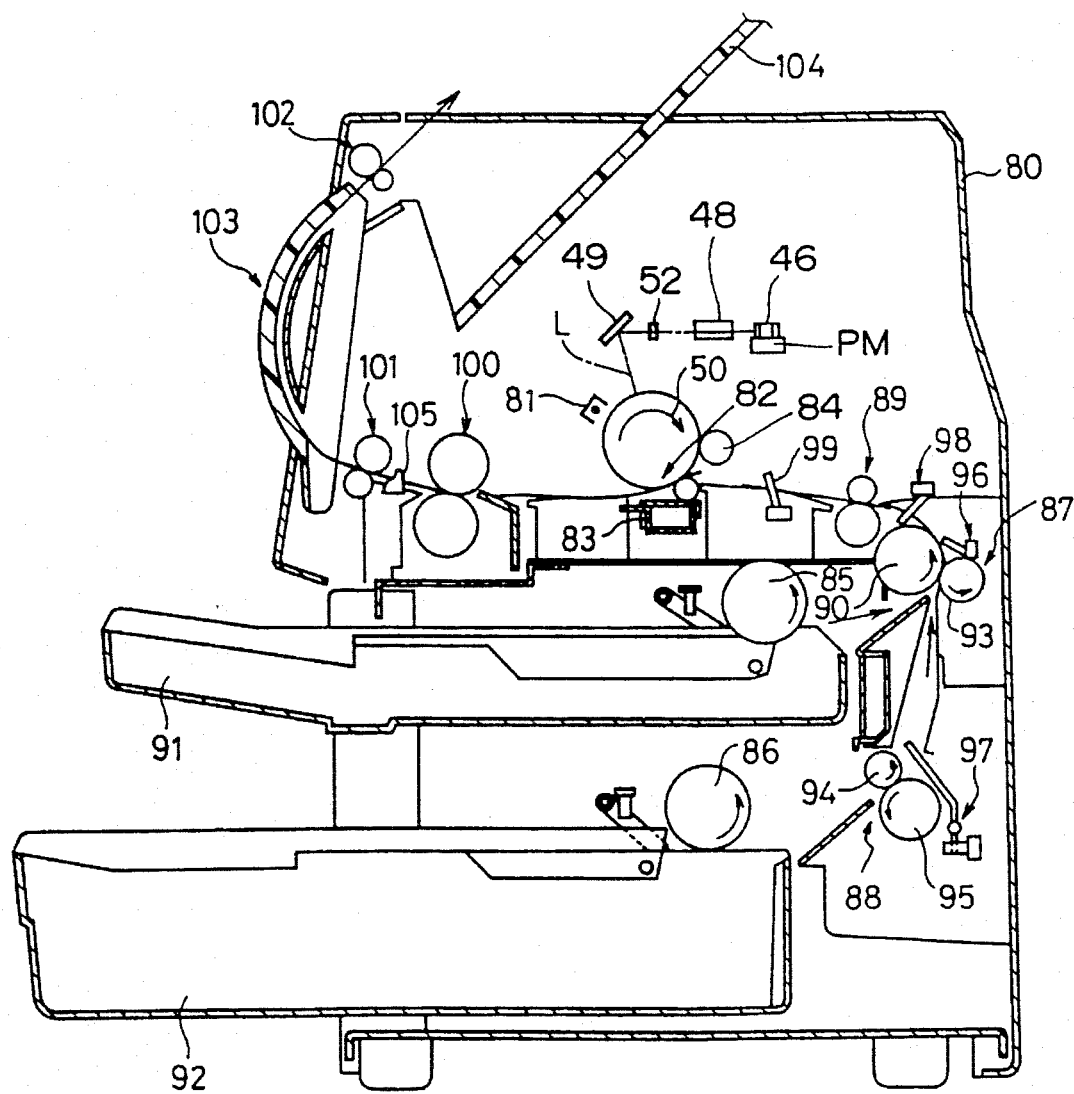
FIG. 1 is a schematic sectional view showing an internal arrangement of a laser beam printer to which a first preferred embodiment of the present invention is applied.

FIG. 1 is a schematic sectional view showing an internal arrangement of a laser beam printer to which a first preferred embodiment of the present invention is applied. The laser beam printer has a cylindrical photoconductor 50 nearly in the center of a laser beam printer body 80. The photoconductor 50 is rotated about its axial line at a fixed angular velocity. Laser beam L which is emitted from a semiconductor laser light source 45 as stated below (see FIG. 3) and reflected by a polygon mirror 46 working as a reflecting mirror, is directed to the photoconductor 50 through an optical system comprised of an fθ lens 48 and a reflecting mirror 49. The laser beam L scans the surface of the photoconductor 50 in one direction along its axial line to write an image on the photoconductor 50.

The photoconductor 50, before being exposed to the laser beam L, is electrostatically charged uniformly throughout its surface by an electrostatic charger 81. Hence, an electrostatic latent image is formed on the surface of the photoconductor 50 after it is exposed to the laser beam L. The electrostatic latent image is developed into a toner image by a developing device 84 as simply shown in FIG. 1. The toner image is transmitted to a transfer position 82 as the photoconductor 50 rotates. A transferer 83 is placed at the transfer position 82, and recording paper is supplied between the transferer 83 and the photoconductor 50. The toner image on the surface of the photoconductor 50 is transferred to the recording paper by means of corona discharge of the transferer 83. The residual toner on the surface of the photoconductor 50 after transfer of the toner image, is removed by a cleaning device (not shown).

Recording paper is supplied from either of two types of sheet feed cassettes 91 and 92 removably attached to the printer body 80. The sheet feed cassettes 91 and 92 contain, for example, different sizes of recording paper from each other. The recording paper sheets in the sheet feed cassettes 91 and 92 are taken out one by one by sheet feed rollers 85 and 86, respectively, guided to a pair of registration rollers 89 via pairs of separating rollers 87 and 88, respectively, and carried to the photoconductor 50. The pair of the separating rollers 87 has a forward rotation roller 90 for urging the recording paper in a forward direction and a reverse rotation roller 93 for urging the recording paper in the reverse direction. Similarly, the pair of the separating rollers 88 has a forward rotation roller 94 and a reverse rotation roller 95.

There are jam detection switches 96 and 97 close to the pairs of the separating rollers 87 and 88, respectively. A registration switch 98 is provided between the pair of the separating rollers 87 and the pair of the registration rollers 89. Also, a timing switch 99 for timing a commencement of writing an image in the photoconductor 50 by the laser beam L is provided between the pair of the registration rollers 89 and the photoconductor 50. Each of the switches 96, 97, 98 and 99 is turned on/off by the recording paper in the course of conveyance.

The recording paper, after transfer of the toner image by the transferer 83, is carried to a fixing portion 100 and the toner image is fixed by heat. After that, the recording paper is directed toward a discharge guide 103 by a pair of discharge rollers 101, guided by the discharge guide 103, and discharged into a paper discharge tray 104 by a pair of ejection rollers 102. Reference numeral 105 designates a discharge switch for timing drive of the pair of the discharge rollers 101 and the pair of the ejection rollers 102.

Figure 2:
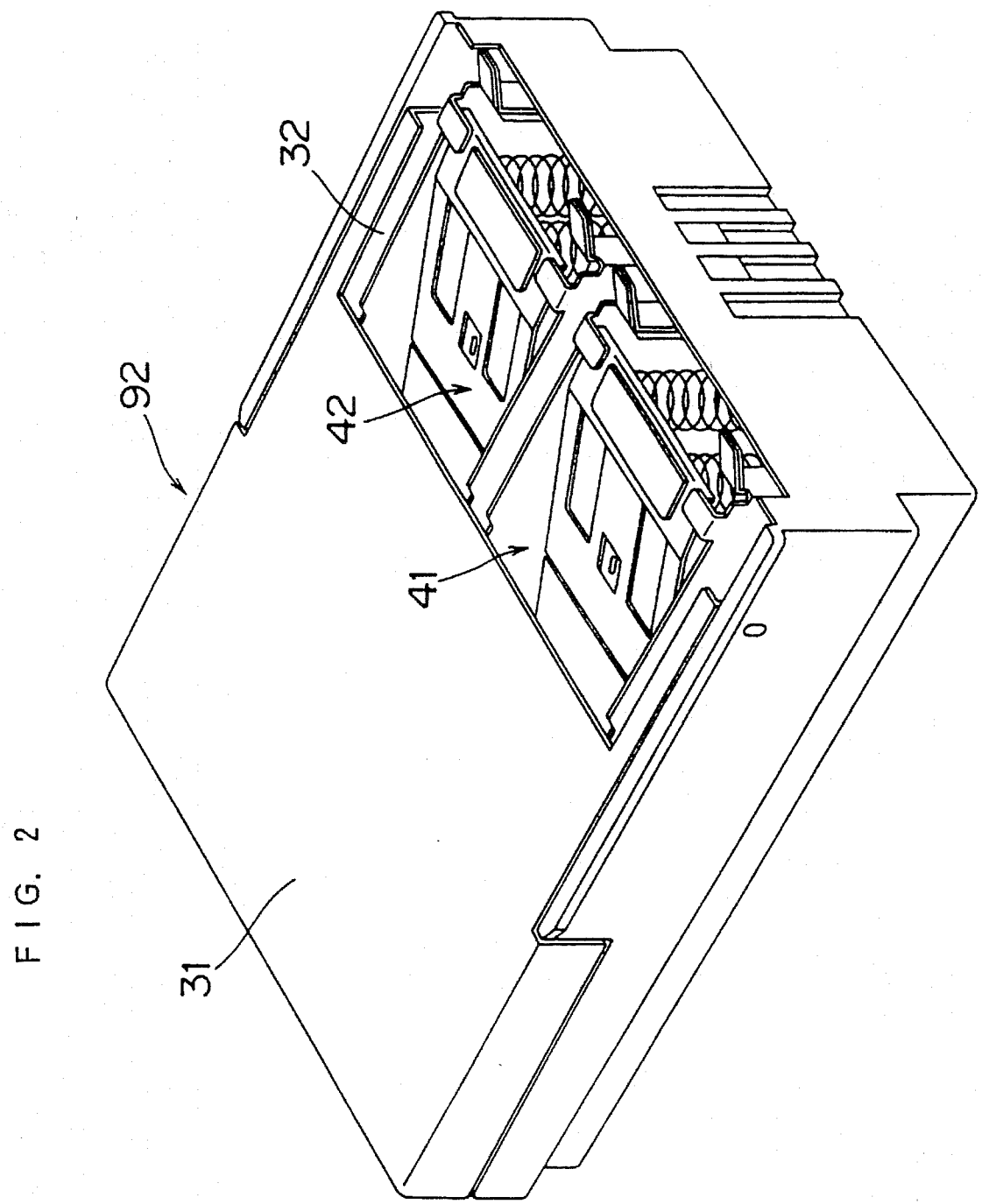
FIG. 2 is a perspective view showing a sheet feed cassette suitable for the first preferred embodiment.

FIG. 2 is a perspective view showing the sheet feed cassette 92. The sheet feed cassette 92 has a sheet feeding opening 32 in an upper surface of a cassette body 31. Close to the opening 32, there are a first and a second recording paper holders 41 and 42 in which relatively small recording paper, like envelopes, can be stacked in parallel. Papers held in the first and second recording paper holders 41 and 42 are taken out sheet by sheet by the sheet feed roller 86 as shown in FIG. 1, and two sheets of the recording paper respectively taken out from the recording paper holders 41 and 42 are fed in parallel to the photoconductor 50.

Figure 3:
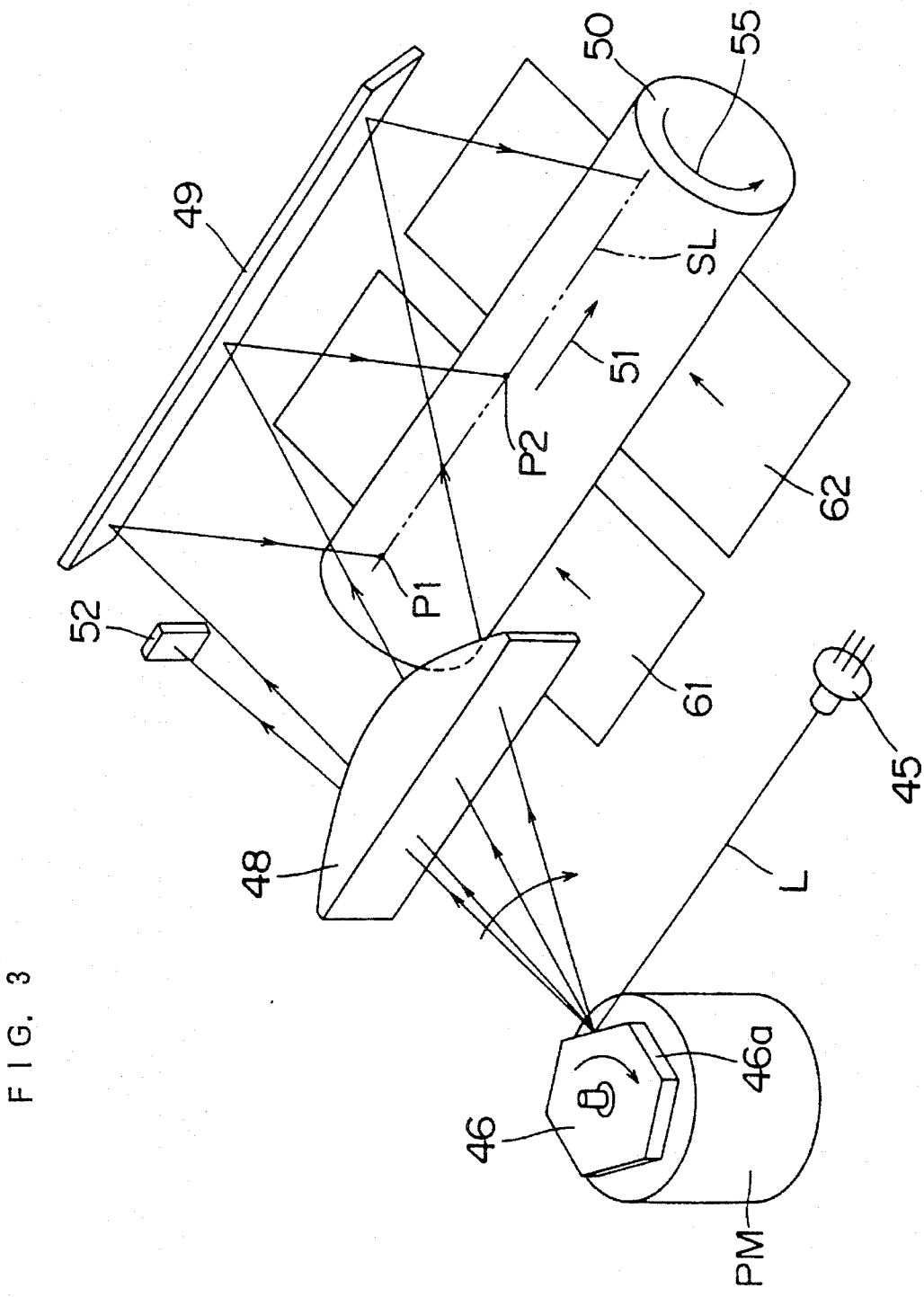
FIG. 3 is a schematic view illustrating a conceptual construction of an image forming unit in the laser beam printer.

FIG. 3 is a schematic diagram illustrating a conceptual construction of parts related to the photoconductor 50. The laser beam L modulated corresponding to an image to be recorded is emitted by the semiconductor laser light source 45. The laser beam L is directed by the polygon mirror 46. The polygon mirror 46 utilizes each face of its hexagonal shape as a reflection surface 46a, and the laser beam L is reflected by the reflection surface 46a.

The polygon mirror 46 is rotated about its axial line by a polygon motor PM as a driving means at a constant angular velocity. Hence, an optical path of the laser beam L, after being reflected by the reflection surface 46a, is momentarily varied. The laser beam L reflected by the polygon mirror 46 passes through the fθ lens 48 and reaches the surface of the photoconductor 50, with its optical path refracted by the reflection mirror 49. The photoconductor 50 is shaped in a right circular cylinder, and the reflection mirror 49 extends in an elongated direction of the photoconductor 50.

With the laser beam L momentarily varying its optical path in accordance with the rotation of the polygon mirror 46, the laser beam L scans the surface of the photoconductor 50 along its axial line in a scanning direction 51 to draw a scanning line SL. In this situation, the laser beam L scans the photoconductor 50 almost at the constant velocity.

A beam detector 52 as a laser light detecting means is placed in a specified position between the fθ lens 48 and the reflection mirror 49. The beam detector 52 detects the laser beam L before commencement of scanning the photoconductor 50.

The photoconductor 50 gains driving force from a driving mechanism (not shown) to rotate about its axial line in a direction of an arrow 55 at a fixed angular velocity. A combination of the primary scanning attained by variation of the optical path of the laser beam L with the secondary scanning attained by rotation of the photoconductor 50 allows the surface of the photoconductor 50 to be exposed to the laser beam L.

In an upstream portion of the arrow 55 from the position where the photoconductor 50 is exposed to light, the electrostatic charger 81 is provided, facing the surface of the photoconductor 50. The electrostatic charger 81 electrostatically charges the photoconductor 50 uniformly throughout its surface. Hence, an electrostatic latent image corresponding to an image to be recorded is formed on the surface of the photoconductor 50 by exposure to the laser beam L. The electrostatic latent image is developed into a toner image by the developing device 84, and the toner image is transferred to a pair of sheets 61 and 62 of recording paper fed from the recording paper holders 41 and 42 of the sheet feed cassette 92.

Figure 4:
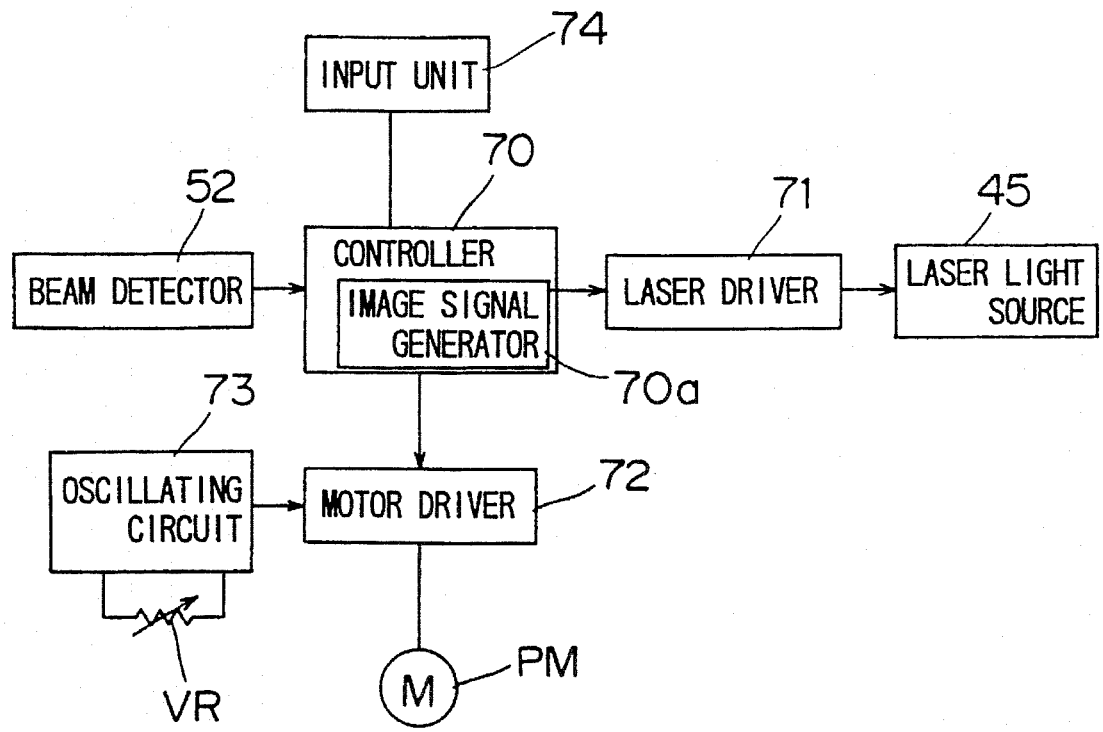
FIG. 4 is a block diagram showing an electric system architecture of the laser beam printer.

FIG. 4 is a block diagram showing an electric system architecture of the above-mentioned laser beam printer. A video signal corresponding to an image to be formed is produced by an image signal generator 70a in a controller 70, and then applied to a laser driver 71 for driving the semiconductor laser light source 45. This causes the semiconductor laser light source 45 to emit the laser beam L modulated corresponding to the image to be formed. The laser driver 71 and the semiconductor laser light source 45 constitute a laser light generating means.

In the event that the sheets 61 and 62 of recording paper are conveyed in parallel toward the photoconductor 50 so that images may be formed simultaneously on those two sheets 61 and 62, the controller 70 produces a video signal corresponding to one scanning line SL in a following manner: Firstly, the controller 70 produces a video signal corresponding to the image to be recorded on the sheet 61 at a specified timing, and then produces a video signal corresponding to the image to be recorded on the sheet 62 after a specified period of time has elapsed corresponding to a distance between the sheets 61 and 62 has elapsed.

An output signal from a beam detector 52 is applied to the controller 70. The beam detector 52, when detecting the laser beam L, produces a beam detection signal. The controller 70 generates a horizontal synchronizing signal based upon the beam detection signal, and applies the video signal to the laser driver 71 at a specified timing based upon the horizontal synchronizing signal.

An input unit 74 for inputting data is connected to the controller 70. A timing in which the video signal is applied to the laser driver 71 is adjustable by inputting predetermined data from the input unit 74. The input unit 74 may be substituted with a key input unit provided within or outside the laser beam printer body 80. The input unit 74 may be externally connected to the printer body 80.

A motor driver 72 for driving a polygon motor PM is connected to the control unit 70. An oscillating circuit 73 as a reference frequency signal generating means for controlling a rotation frequency of the polygon motor PM is connected to the motor driver 72. The oscillating circuit 73 has a variable resistance VR, and its oscillation frequency can be varied by adjusting the variable resistance VR. When the oscillation frequency is varied, the rotation frequency of the polygon motor PM is altered.

Figure 5:
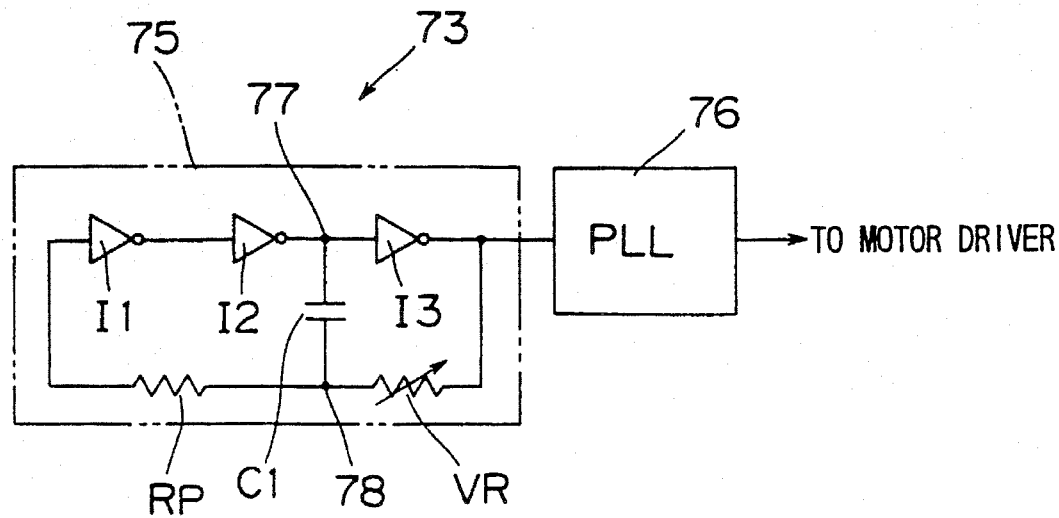
FIG. 5 is a block diagram showing an arrangement of an oscillation circuit.

FIG. 5 is a block diagram showing an arrangement of the oscillating circuit 73. The oscillating circuit 73 has an oscillating unit 75 and a PLL (Phase-Locked Loop) circuit 76 receiving a signal generated by the oscillating unit 75 for producing a signal of a stable frequency. The oscillating unit 75 has three inverting gates I1, I2 and I3 connected in series to one another. An output signal of the inverting gate I3 is fed back to the inverting gate I1 via the variable resistance VR and a resistance RP for input protection. A capacitor C1 is connected to a junction 77 between the inverting gates I2 and I3 and a junction 78 between the resistances VR and RP.

In such an arrangement, when a resistance value of the variable resistance VR is varied, current charging or discharging the capacitor C1 is varied. This causes a change in speed at which a potential at the junction 78 varies. Thus, varying the resistance value of the variable resistance VR allows the oscillation frequency to vary.

Figure 6A:
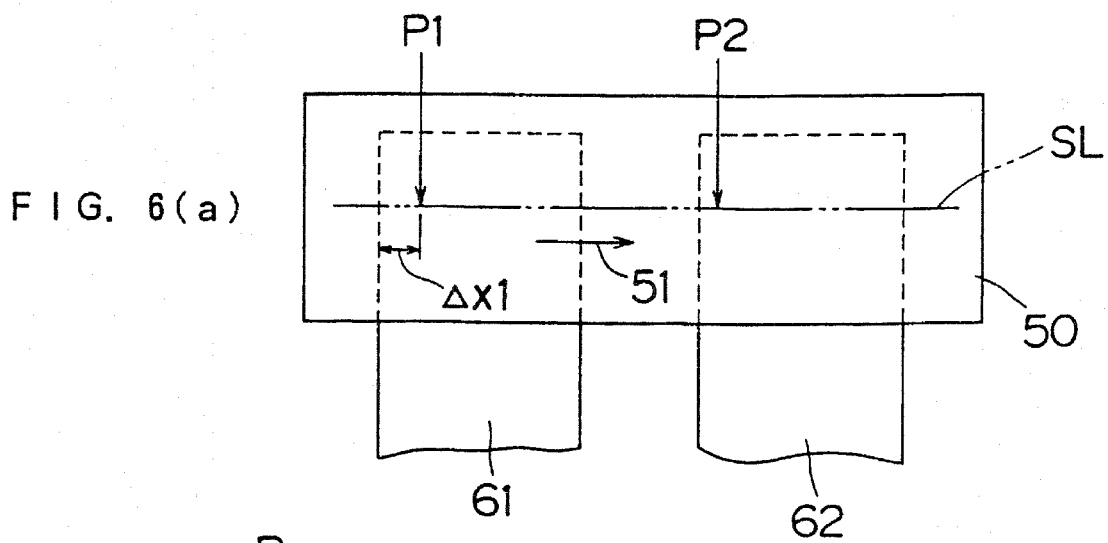
FIGS. 6(a) to 6(c) are schematic plan views illustrating positional relations between a photoconductor and recording paper.
Figure 6B:
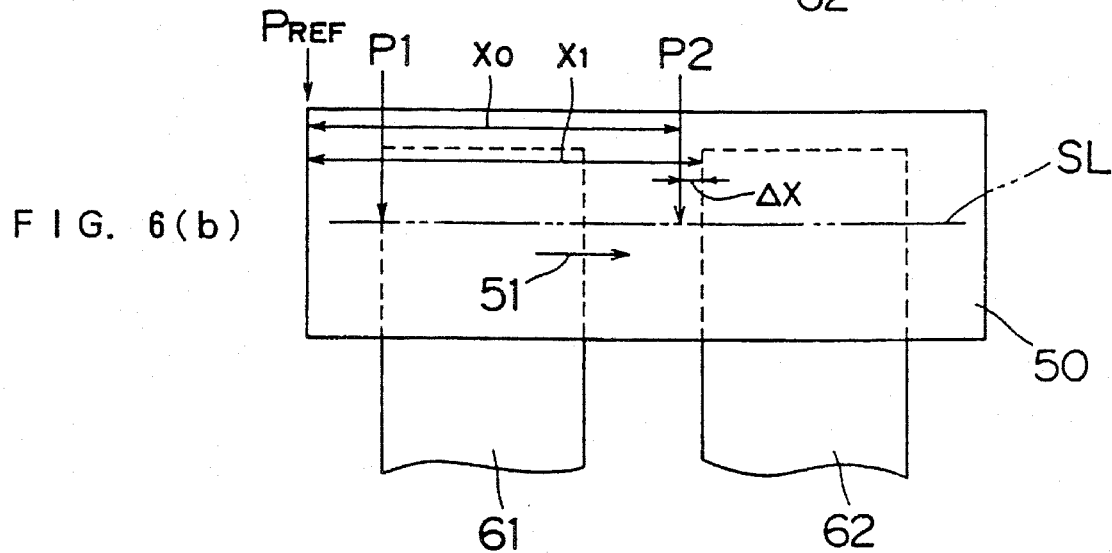
Figure 6C:
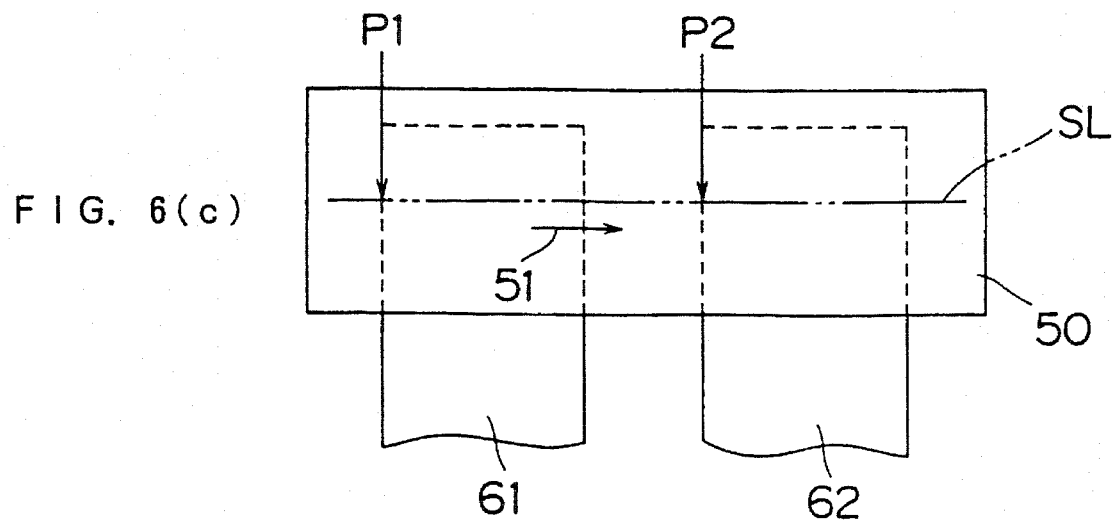
Figure 9A:
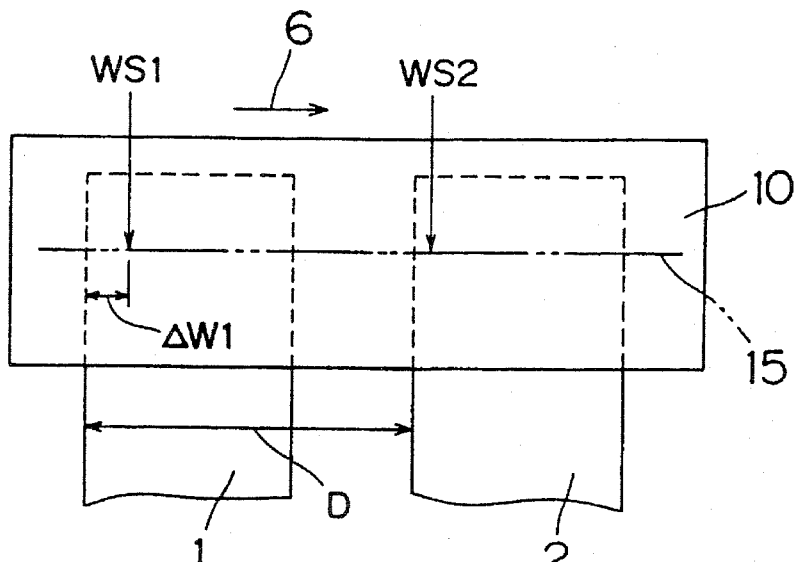
FIGS. 9(a) and 9(b) are schematic plan views illustrating prior art for adjusting image writing positions on a photoconductor.
Figure 9B:
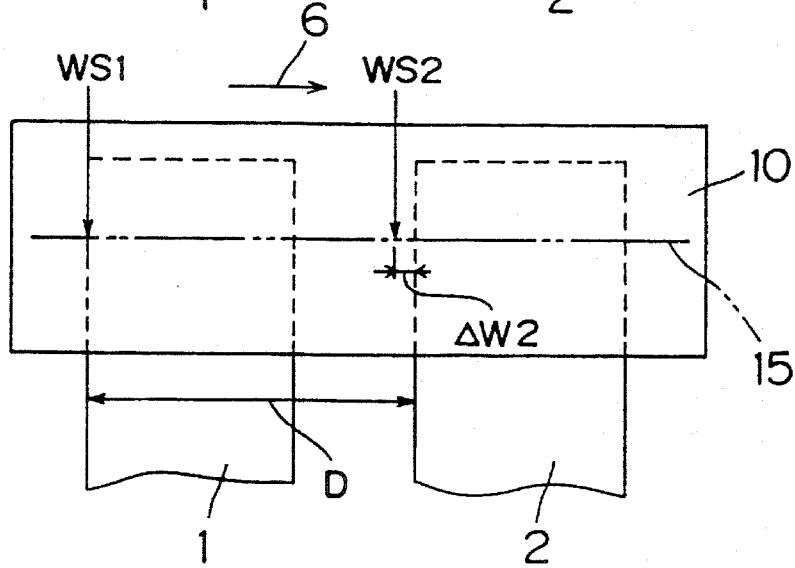

FIGS. 6(a) to 6(c) are schematic plan view illustrating positional relations among the photoconductor 50 and the sheets 61 and 62. Referring to these figures, there will be described an adjustment which is performed in a fabrication process for forming images in accurate positions on the sheets 61 and 62.

In the adjustment, an operator first conducts printing on the sheets 61 and 62 on trial. As a result, for example, it now is assumed that a position P1 from which image writing on the sheet 61 is to be started is deviated by $\Delta x1$ toward a downstream side of the scanning direction 51, as shown in FIG. 6(a).

In this case, the operator first adjusts data in the controller 70 to alter an output timing of the video signal relative to the horizontal synchronizing signal, thereby shortening a period from detection of the laser beam L by the beam detector 52 until application of the video signal to the laser driver 71. Such adjustment allows the writing start position P1 for the sheet 61 to shift toward an upstream side of the scanning direction 51, resulting in a state as illustrated in FIG. 6(b). That is, the position P1 and a position to which the sheet 61 is to be fed, are registered.

If the position P1 is deviated toward the upstream side of the scanning direction 51, the system needs to extend a period from the detection of the laser beam L by the beam detector 52 until the application of the video signal by the controller 70 to the laser driver 71, in order to shift the position P1 toward a downstream side of the scanning direction 51.

When a writing start position P2 from which image writing for the sheet 62 is started is somewhat deviated in the state as illustrated in FIG. 6(b) where the adjustment of the position P1 is completed, the operator proceeds to the next operation in adjustment. Specifically, let it be supposed, for example, that the position P2 is deviated by a distance $\Delta x$ toward the upstream side of the scanning direction 51, as shown in FIG. 6(b).

The operator, in this case, adjusts the variable resistance VR to enhance an oscillation frequency of the oscillating circuit 73. This increases a rotation frequency of the polygon motor PM, thus accelerating a scanning speed of the laser beam L on the photoconductor 50. On the other hand, a speed at which the controller 70 applies a video signal to the laser driver 71, is constant. Hence, the writing start position P2 for the sheet 62 is shifted toward the downstream side of the scanning direction 51.

As a result of the adjustment, when the position P2 is registrated to a position where the sheet 62 is to be fed as shown in FIG. 6(c), the resistance value of the variable resistance VR is fixed and the adjustment is completed. For example, a movable element for resistance adjustment in the variable resistance VR may be fixed by silicon resin.

When the position P2 is somewhat deviated toward the downstream side of the scanning direction 51, the variable resistance VR may be adjusted to lower the oscillation frequency of the oscillating circuit 73, so that the speed with which the laser beam L scans the photoconductor 50 can be decreased.

With reference to FIG. 6(b), adjustment of the writing start position P2 will be further explained. It is now assumed, for example, that a terminal of the upstream side of the scanning direction 51 in the photoconductor 50 is a reference position $P_{REF}$. A distance from the reference position $P_{REF}$ to the position P2 is $x_0$ while a distance from the position $P_{REF}$ to one end of the sheet 62 is $x_1$ ($=x_0+\Delta x$). In this case, the rotation frequency of the polygon mirror 46 may be altered so that the distance x from the reference position $P_{REF}$ to the position P2 changes from $x_0$ to $x_1$.

In the arrangement as shown in FIG. 3, the following Formulas (1) to (4) are given:

$$R \cdot n = 60/T \quad (1)$$

$$L = 2 \cdot f \cdot \theta \quad (2)$$

$$v = L/T \quad (3)$$

$$v \cdot t = x \quad (4)$$

where R is a rotation frequency (rpm) of the polygon mirror, n is the number of faces of the polygon mirror, T is a period of time (sec) required to complete a single scanning, L is an amplitude of scanning, f is a F-value of the fθ lens, θ is an angle of view of one face of the polygon mirror, v is a velocity of beam scanning, and t is a period of time required to scan the distance x.

In accordance with the Formulas (1) and (3), the following Formula (5) is obtained:

$$R \cdot n = 60 \cdot v/L \quad (5)$$

The Formula (5) can be rewritten into the following Formulas (6) and (7) by adding a subscript "0" to each variable before the adjustment of the rotation frequency of the polygon mirror 46, a subscript "1" to each variable after the adjustment, respectively.

$$R_0 \cdot n = 60 \cdot v_0 / L \quad (6)$$

$$R_1 \cdot n = 60 \cdot v_1 / L \quad (7)$$

which yield Formula (8) as follows:

$$n \cdot \Delta R = (60/L) \cdot \Delta v \quad (8)$$

where $\Delta R = R_1 - R_0$, and $\Delta v = v_1 - v_0$.

Furthermore, allowing for the fact that a speed at which the video signal is applied to the laser driver 71 is invariable regardless of the adjustment of the rotation frequency of the polygon mirror 46, a period of time required for the laser beam L to scan the reference position $P_{REF}$ to the position P2 is constant. Thus, the following Formulas (9) and (10) are given:

$$x_0 = v_0 \cdot t_0 \quad (9)$$

$$x_1 = v_1 \cdot t_0 \quad (10)$$

which yield Formula (11) as follows:

$$\Delta x = x_1 - x_0 = (v_1 - v_0) \cdot t_0 = \Delta v \cdot t_0 \quad (11)$$

Using the Formula (11) and Formula (8), following Formula (12) can be obtained:

$$n \cdot \Delta R = (60 \cdot \Delta x)/(L \cdot t_0) \quad (12)$$

Additionally, substituting $\theta = 2 \cdot \pi / n$ into the Formula (2), Formula (13) is obtained:

$$L = 4 \cdot \pi \cdot f / n \quad (13)$$

Substituting Formula (13) into the Formula (12) and rearranging, the following Formula (14) is obtained:

$$\Delta x = (\pi \cdot f / 15) \cdot t_0 \cdot \Delta R \quad (14)$$

On referring Formulas (6) and (13) and $v_0 \cdot t_0 = x_0$, Formula (15) is given as follows:

$$t_0 = (15 \cdot x_0)/(\pi \cdot f \cdot R_0) \quad (15)$$

Substituting Formula (15) into Formula (14), the following Formulas (16) and (17) are obtained:

$$\Delta x = x_0 \cdot \Delta R / R_0 \quad (16)$$

$$\Delta R = R_0 \cdot \Delta x / x_0 \quad (17)$$

If $x_0$ and $\Delta x$ are found, the position P2 can be registrated with the position to which the sheet 62 is to be fed by varying the rotation frequency R of the polygon mirror 46 by $\Delta R$ obtained according to the foregoing Formula (17).

When the rotation frequency of the polygon mirror 46 is varied, the writing start position P1 in the sheet 61 is accordingly deviated. However, a deviation of the writing position caused by a change of the rotation frequency of the polygon mirror 46 becomes larger as the writing position is farther from the reference position $P_{REF}$, whereas the deviation is not varied so much if the writing position lies in an area close to the reference position $P_{REF}$. Furthermore, a positional deviation $\Delta x$ of the position P2 in the state as illustrated in FIG. 6(b) is at most about 2 mm. Hence, a shift of the position P1 caused by varying the rotation frequency of the polygon mirror 46 can be ignored.

In accordance with the embodiment as described above, firstly, a period of time from detection of the laser beam L by the beam detector 52 until application of the video signal to the laser driver 71 is adjusted, thereby making adjustment of the writing start position P1 corresponding to the sheet 61 closer to the reference position $P_{REF}$. And then, the rotation frequency of the polygon mirror 46 is adjusted, thereby accomplishing the adjustment of the position P2 with almost no positional shift of the position P1. Consequently, both the positions P1 and P2 can be adjusted well. In this way, the printer to which adjustment operation as stated above is completed can form images with enhanced positional accuracy onto the sheets 61 and 62 of the recording paper fed in parallel from the recording paper holders 41 and 42 of the sheet feed cassette 92.

Since the writing start positions P1 and P2 can be separately adjusted as mentioned above, a paper feed mechanism for feeding the sheets 61 and 62 to the photoconductor 50 does not call for a high accuracy of paper feeding. Specifically, even if every manufactured printer is somewhat different in paper feeding, adjustment of the writing start positions P1 and P2 can remove any influence of such a difference. As a result, good image formation can be performed onto a pair of the sheets 61 and 62 fed in parallel without further cost increase.

Although the preferred embodiment of the present invention has been described, it is not intended that the invention be precisely limited to the embodiment. For example, a case where the two sheets 61 and 62 are fed in parallel to the photoconductor 50 has been described in the above embodiment, but the invention is applicable to a case where three or more sheets are to be fed in parallel. In such a case, control of a writing start position through control of the rotation frequency of the polygon mirror 46 may be conducted to a writing start position corresponding to a sheet fed to the most downstream side along the scanning direction.

Also, although a polygon mirror is used for a time-varying optical path of the laser beam in the above embodiment, it may be replaced with another arrangement such as a galvanomirror.

Moreover, although a photoconductor shaped in a right circular cylinder is used in the embodiment, it may be shaped in an endless belt.

Furthermore, although images are formed on paper in the above embodiment, they may be formed on transparent sheets other than paper sheets, for example, as used in an overhead projector.

Although the rotation frequency of the polygon mirror 46 is varied by adjusting the variable resistance VR in the above embodiment, the rotation frequency of the polygon mirror 46 may be adjusted, for example, by input operation from a key input unit provided in a printer. This makes it possible to perform not only adjustment in a manufacturing line, but also adjustment in maintenance.

While the preferred embodiment of the present invention has been described in detail, this is an example for setting forth the technical subject of the present invention, and the present invention should not be understood narrowly as limited to the example. The true spirit and scope of the present invention should be restricted only by the appended claims.

What is claimed is:

1. A method of adjusting image forming positions in an apparatus in which laser light, which is modulated suitable to images to be formed, scans a photoconductor at an approximately constant velocity to write a plurality of images arranged in parallel along a scanning direction of the laser light, such that a plurality of toner images may be formed on a plurality of recording sheets fed in parallel, said method comprising:

adjusting a timing of modulating the laser light suitable to a first image to be written by the laser among the plurality of images so that a writing position of the first image to be written lies at a first specified position, and varying a scanning velocity of the laser light on the photoconductor to adjust image forming positions so that a writing position of a last image to be written by the laser light among the plurality of images lies at a second specified position.

2. A method of adjusting image forming positions according to claim 1, further including:

detecting a timing of the laser light scanning on the photoconductor, and adjusting the timing of modulating the laser light suitable to the first image to be written based upon the detected timing of the laser light scanning.

3. A method of adjusting image forming positions according to claim 1, wherein:

the laser light is emitted by a laser light source, and the laser light is reflected and directed to the photoconductor by a rotatable reflection mirror, to thereby scan the laser light on the photoconductor, and said scanning velocity is changed by varying a rotation speed of the reflection mirror.

4. An image forming apparatus in which laser light modulated suitable to images to be formed scans a photoconductor at an approximately constant velocity to write a plurality of images arranged in parallel along a scanning direction of the laser light, the apparatus comprising:

a sheet feed mechanism for feeding a plurality of recording sheets, in parallel, to the photoconductor;

developing means for developing images written on the photoconductor into toner images;

transfer means for transferring a plurality of toner images on the photoconductor onto the respective plurality of recording sheets fed by the sheet feed mechanism;

image signal producing means for producing an image signal corresponding to the plurality of images to be formed on the respective recording sheets fed by the sheet feed mechanism;

laser light generating means for generating laser light which is modulated in accordance with the image signal produced by said image signal producing means;

scanning means variable in its scanning velocity and utilizing light emitted by the laser light generating means for scanning the photoconductor at an approximately constant velocity;

detecting means for detecting a timing of the laser light scanning on the photoconductor;

control means for starting transmission of the image signal from the image signal producing means to the laser light generating means at an adjustable timing which is set based upon the timing of the laser light scanning detected by the detecting means;

first adjusting means for adjusting the timing of starting transmission of the image signal to the laser light generating means relative to the timing of the laser light scanning detected by the detecting means so as to adjust a writing position of a first image to be written by the laser light among the plurality of images so that the first image lies at a first position, the first image corresponding to a toner image to be transferred by the transfer means onto a first recording sheet which is fed on a most upper stream side with respect to the scanning direction of the laser light; and second adjusting means for adjusting the scanning velocity of the scanning means to adjust a writing position of a last image to be written by the laser light among the plurality of images so that the last image lies at a second position, the last image corresponding to a toner image to be transferred by the transfer means onto a last recording sheet which is fed on a most downstream side with respect to the scanning direction of the laser light.

5. An image forming apparatus according to claim 4, wherein:

said scanning means includes a reflection mirror for reflecting and directing laser light emitted by the laser light generating means to the photoconductor, and driving means for rotating the reflection mirror at a rotation frequency; and said second adjusting means varies the rotation frequency of the driving means to vary the scanning velocity.

6. An image forming apparatus according to claim 5, wherein:

said second adjusting means includes a reference frequency signal generating means for generating a reference frequency signal to determine the rotation frequency of the driving means, and means for adjusting a frequency of the reference frequency signal generated by the reference frequency signal generating means; and said driving means rotates the reflection mirror based upon the reference frequency signal.

7. An image forming apparatus according to claim 4, wherein:

said second adjusting means includes a reference frequency signal generating means for generating a reference frequency signal to determine the scanning velocity of the scanning means, and means for adjusting a frequency of the reference frequency signal generated by the reference frequency signal generating means.

8. An image forming apparatus according to claim 4, wherein:

said detecting means includes laser light detecting means for receiving the laser light at a specified position and for outputting a detection signal; and a relation between a timing at which the laser light detecting means outputs the detection signal and the timing of starting transmission of the image signal to the laser light generating means is adjusted to adjust the writing position of the first image to be written by the laser light.

* * * * *